US009780913B2

(12) United States Patent
Reial et al.

(10) Patent No.: US 9,780,913 B2
(45) Date of Patent: Oct. 3, 2017

(54) DECODING MARGIN ESTIMATION

(71) Applicant: Telefonaktiebolaget L M Ericsson (publ), Stockholm (SE)

(72) Inventors: Andres Reial, Malmo (SE); Joakim Axmon, Kavlinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 83 days.

(21) Appl. No.: 14/905,283

(22) PCT Filed: Oct. 23, 2015

(86) PCT No.: PCT/EP2015/074659
§ 371 (c)(1),
(2) Date: Jan. 14, 2016

(87) PCT Pub. No.: WO2017/067613
PCT Pub. Date: Apr. 27, 2017

(65) Prior Publication Data
US 2017/0126355 A1    May 4, 2017

(51) Int. Cl.
*H04L 1/00* (2006.01)
*H04L 5/00* (2006.01)
(52) U.S. Cl.
CPC .......... *H04L 1/0009* (2013.01); *H04L 5/0055* (2013.01); *H04L 5/0064* (2013.01)
(58) Field of Classification Search
CPC .... H04L 1/0009; H04L 5/0055; H04L 5/0064
(Continued)

(56) References Cited

U.S. PATENT DOCUMENTS

2006/0150051 A1   7/2006  Kwon et al.
2009/0086686 A1*  4/2009  Rudolf .................. H04L 1/0086
                                                         370/336
(Continued)

FOREIGN PATENT DOCUMENTS

WO         0191356 A1    11/2001

OTHER PUBLICATIONS

3GPP TS 36.213 V10.12.0 (Mar. 2014), 3rd Generation Partnership Project; Technical Specification Group Radio Access Network; Evolved Universal Terrestrial Radio Access (E-UTRA); Physical layer procedures (Release 10), Section 7.2.3, 8 pages.
(Continued)

*Primary Examiner* — Stephen J Clawson
(74) *Attorney, Agent, or Firm* — Leffler Intellectual Property Law, PLLC

(57) ABSTRACT

The present disclosure relates to methods and devices for determining transmission properties for communication between a wireless device and a radio network node. The disclosure also relates to computer programs performing the methods. The disclosure proposes a method, performed in the wireless device, comprising receiving a transport block from a radio network node, creating one or more punctured versions of the transport block, wherein an encoding redundancy of the punctured versions of the transport block is reduced compared to that of the original transport block, decoding at least one of the one or more punctured versions of the transport block and determining a decoding margin associated with the original transport block, based on the decoding of the one or more punctured versions of the transport block. The disclosure also proposes a method in the radio network node.

37 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2009/0207781 A1* | 8/2009 | Sidi | ....................... | H04L 1/1819 |
| | | | | 370/328 |
| 2011/0035639 A1* | 2/2011 | Earnshaw | ............. | H04L 1/1812 |
| | | | | 714/748 |
| 2011/0228863 A1* | 9/2011 | Papasakellariou | .... | H04L 1/0031 |
| | | | | 375/259 |
| 2013/0294357 A1* | 11/2013 | Shimanuki | ............ | H04L 1/0003 |
| | | | | 370/329 |
| 2016/0261321 A1* | 9/2016 | Andgart | ............... | H04B 7/0456 |

OTHER PUBLICATIONS

PCT International Search Report, mailed Feb. 3, 2016, in connection with International Application No. PCT/EP2015/074659, all pages.
Ulf Anderson et al., 2008:010 CIV Master's Thesis, Downlink Baseband Decoder Implementation, Lulea University of Technology, Nov. 2, 2007, 81 pages, Gothenburg, Sweden.
3GPP TSG RAN WG1 Meeting #75, R1-135776, San Francisco, USA, Nov. 11-15, 2013, Qualcomm Incorporated, Analysis of Rate-Matching and Interleaving Enhancements, 9 pages.

* cited by examiner

S25
configuring transmission properties to be used for further communication between the radio network node and the wireless device based on the decoding margin

S251
changing the robustness of transmissions of one or more further transport blocks between the radio network node and the wireless device, in relation to the robustness of the transmission of the first transport block

S252
selecting transmission properties corresponding to a robustness which is higher than the robustness of transmissions of the transmission of the first transport block, if the information indicative of a decoding margin is below a predefined level

S253
selecting transmission properties corresponding to a robustness which is lower than the robustness of transmissions of the transmission of the first transport block, if the information indicative of a decoding margin is above a predefined level

Fig. 6b

DECODING MARGIN ESTIMATION

TECHNICAL FIELD

The present disclosure relates to a method in a wireless device for determining transmission properties for communication with a radio network node and a method, performed in a radio network node, of configuring transmission properties for communication with a wireless device. More particularly the disclosure pertains to determining and configuring transmission properties based on a determined decoding margin. The disclosure also relates to a corresponding wireless device, radio network node and computer programs.

BACKGROUND

The 3rd Generation Partnership Project, 3GPP, is responsible for the standardization of the Universal Mobile Telecommunication System (UMTS) and Long Term Evolution, LTE. The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex (FDD) and Time Division Duplex (TDD) modes.

In mobile communication systems, it is generally the base stations that allocate the resources for transmissions in both uplink and downlink. In LTE, a wireless device, referred to as a User Equipment, UE, carries out measurements to provide indications to the base station on the perceived radio propagation conditions in what is called Channel Quality Indicator, CQI, reporting. Based on the reporting the base station can decide roughly which Modulation and Coding Scheme, MCS, to use for communication with the UE. One example of mapping between CQI and MCS is shown in Table 1 below, which is the retrieved from 3GPP TS 36.213 V10.12.0 section 7.2.3. In low channel quality (low COI index) more forward error correction encoding is needed for successful decoding of the information bits, and vice versa in high channel quality i.e. high CQI index. Hence at high CQI the throughput of information bits can be made higher than at low CQI.

TABLE 1

| 4-bit CQI table from 3GPP | | | |
|---|---|---|---|
| CQI index | modulation | code rate × 1024 | Efficiency |
| 0 | out of range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

In order to get a good system throughput throughout the base station, in LTE referred to as an eNodeB, carries out link adaptation by which it matches each UE's reported channel quality to an MCS that provides the right balance between system throughput and throughput for the individual user. The MCS is indicated to the UE in the Downlink Control Information, DCI, provided over Physical Data Control Channel, PDCCH, in LTE. This is shown in Table 2 from the same TS.

In addition to CQI reporting a base station typically has an outer loop that, based on ACK/NACK reports, tunes in the MCS value to a suitable value giving a BLER (block error rate, ratio between NACKs and total number of received or expected ACK/NACKs) at first transmission of e.g. 10%. Besides catering for flexibility in which target BLER is used (e.g. 1%, 10%, 30%), it also solves the problem that each UE model or even UEs of the same model may have an individual bias in the reported CQI. The base station thus maintains a UE-specific CQI offset which it tunes to give the desired BLER target.

TABLE 2

| Modulation and Transport Block Size, TBS, index table for PDSCH | | |
|---|---|---|
| MCS Index $I_{MCS}$ | Modulation Order $Q_m$ | TBS Index $I_{TBS}$ |
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

Existing control loops on the base station side for determining the UE-specific MCS are largely based on maintaining a particular BLER ratio and identifying UE-specific bias in the CQI reporting. Once the CQI bias has been identified, the base station can more accurately select MCS based on the CQI reported by the UE. During identification of the CQI bias the base station will decrease or increase the MCS for a given CQI until the BLER target is met over some interval of time.

The expansion of machine-type communication, MTC, toward industrial applications is seen as one of the key features in future communication systems. The requirements on connectivity are very diverse and largely depend on the use case of an industrial application to be operated. Therefore, different Critical-MTC (i.e., ultra-reliable MTC) solutions will be needed. Besides the end-to-end latency, the Critical-MTC concept should address the design trade-offs regarding transmission reliability, mobility, energy-efficiency, system capacity and deployment, and provide solutions for how to design a wireless network in a resource and energy efficient way while enabling ultra-reliable communication.

For scheduling of UEs that are to fulfill extreme requirements on BLER, e.g. down to $10^{-9}$, while at the same time fulfilling extreme requirements on latency, i.e. being able to send and receive new information every subframe, effectively making re-transmissions infeasible, block errors have to be avoided as far as possible.

Typical outer loop link adaptation implementations are based on statistics of actual first transmission block errors. With existing implementation it may thus be problematic to adjust transmission properties such as MCS to resource efficient levels without allowing block errors occasionally and as a result the base station (or network node) is forced to be very conservative in the MCS selection. Being conservative implies using a lower/less aggressive MCS than called for, resulting in that more resources are used for the particular UE than necessary, with reduced system throughput as result.

SUMMARY

An object of the present disclosure is to provide methods and devices which seek to mitigate, alleviate, or eliminate one or more of the above-identified deficiencies in the art and disadvantages singly or in any combination.

This is obtained by a method, performed in a wireless device, for determining transmission properties for communication with a radio network node. The method comprises receiving a transport block from a radio network node, creating one or more punctured versions of the transport block, wherein an encoding redundancy of the punctured versions of the transport block is reduced compared to that of the original transport block, decoding at least one of the one or more punctured versions of the transport block, and determining a decoding margin associated with the original transport block, based on the decoding of the one or more punctured versions of the transport block. Thereby, the wireless device can evaluate the transmission properties of the transmission of the transport block. The evaluation is made to see if the transport block could have been sent with less conservative transmission properties. The evaluation can be performed in the wireless device without involvement of the network node. A scheme for decoding margin estimation is thus provided using a metric that is not specific to the UE implementation, does not consume network resources and does not introduce additional latencies, while still avoiding block errors and re-transmissions.

According to some aspects, the method comprises decoding the received transport block. By decoding the received transport block, it is for example determined whether the transmission properties of the initial transmission of the transport block was conservative enough; i.e. that the transport block was successfully received and decoded at the wireless device.

According to some aspects, the steps of creating one or more punctured versions, the decoding at least one of the one or more punctured versions of the transport block and the determining a decoding margin are performed when the decoding of the received transport block is successful. The puncturing is thus performed only after successfully decoding the received transport block, which saves computational resources of the wireless device.

According to some aspects, the steps of creating and decoding are iterated until the decoding of a punctured version of the transport block is unsuccessful. In this way, decoding of transport blocks with different encoding redundancies is performed. When a decoding is unsuccessful, the iteration is stopped because then a level of encoding redundancy has been found at which the wireless device is unable to decode.

According to some aspects, the step of determining a decoding margin comprises determining a number of successfully decoded punctured versions of the transport block. This is an informative way of determining the decoding margin which requires little computational resources.

According to some aspects, the step of determining a decoding margin comprises determining a highest code rate after puncturing for which the decoding is successful, wherein the highest code rate is associated with a lowest coding redundancy. This is an informative way of determining the decoding margin which requires little computational resources.

According to some aspects, the step of determining a decoding margin comprises determining a ratio or difference between a code rate of the decoded received transport block and a code rate of a successfully decoded punctured version of the transport block. This is an informative way of determining the decoding margin which requires little computational resources.

According to some aspects, whether decoding is successful or not is established with a Cyclic Redundancy Check of the decoded transport block. A Cyclic Redundancy Check, CRC, is an effective way of determining the successfulness of decoding.

According to some aspects, each punctured version of the transport block comprises a transport block with a reduced encoding redundancy compared to that of a previous punctured transport block and compared to that of the received transport block. Hence, each new punctured version of the transport block has less encoding redundancy, i.e. higher code rate, than previous punctured versions. The reduction in encoding redundancy provides a way to determine at what encoding redundancy the decoding limit for the wireless device has been reached.

According to some aspects, the method comprises transmitting information defining the decoding margin to a radio network node. By informing the network node, the network node may utilize the information to for example reconfigure the transmission properties between the network node and the wireless device. Depending on the decoding margin, the network node can be less conservative when selecting transmission properties for the wireless device, thereby allowing more resources to be used for other wireless devices. This may be done without risking occasionally losing transport blocks since the decoding margin is known. As a consequence, the system throughput can be improved while at the same time offering highly reliable communication with the device.

According to some aspects, the transmitting comprises to transmit an acknowledgement, ACK, of the successful reception and decoding of the transport block and wherein the ACK comprises an indication of the decoding margin. By using an ACK to transmit the decoding margin, no extra transmission is required from the wireless device to send the decoding margin, because the ACK/NACK transmissions will either way be sent.

According to some aspects, the ACK defines one of several possible ACK levels, wherein each ACK level corresponds to a predefined decoding margin. Hence, the configuration of ACKs is utilized to transmit the decoding margin.

According to some aspects, the method comprises sending a request to enable an ACK reporting format indicating a decoding margin to the radio network node. In other words, the wireless device requests to the radio network node to use ACK when reporting the decoding margin.

According to some aspects, the method comprises receiving a request to enable an ACK reporting format indicating a decoding margin from the radio network node. In this case, it is the radio network node that requests that ACK is to be used for reporting the decoding margin.

According to some aspects, the method comprises activating or deactivating one or more antennas based on the decoding margin. In other words, the decoding margin can be used in the wireless device to determine how many antennas are needed for adequate transmissions, i.e. transmissions with acceptable reliability.

A wireless device comprising a radio communication interface and processing circuitry is also disclosed to obtain the object. The processing circuitry is configured to receive a transport block from a radio network node, to create one or more punctured versions of the transport block, wherein an encoding redundancy of the punctured versions of the transport block is reduced compared to that of the original transport block, to decode at least one of the one or more punctured versions of the transport block and to determine a decoding margin associated with the original transport block, based on the decoding of the one or more punctured versions of the transport block. The wireless device is further configured to perform all the aspects of the method in a wireless device described above and below.

According to some aspects, the disclosure also relates to a computer program comprising computer program code which, when executed in a programmable controller of a wireless device, causes the wireless device to execute the methods described above and below.

A method, performed in a radio network node of configuring transmission properties for communication with a wireless device is also disclosed to obtain the object. The method comprises sending a first transport block to the wireless device using a first set of transmission properties between the radio network node and the wireless device, requesting, from the wireless device, information indicative of a decoding margin, associated with the first transport block, wherein the decoding margin indicates whether decoding of one or more punctured versions of the received first transport block in the wireless device has been successful, wherein an encoding redundancy of the punctured versions of the transport block is reduced compared to that of the first transport block and obtaining, from the wireless device, information indicative of a decoding margin, and configuring transmission properties to be used for further communication between the radio network node and the wireless device based on the decoding margin. The radio network node can thus avoid resource draining evaluations of the transmission properties by requesting a decoding margin from the wireless device which the wireless device uses the first transport block to determine.

According to some aspects, the configuring comprises changing the robustness of transmissions of one or more further transport blocks between the radio network node and the wireless device, in relation to the robustness of the transmission of the first transport block. Using the decoding margin, the radio network node can determine how to change the robustness of the transmission compared to that of the one used when transmitting the first transport block. I.e. the decoding margin gives the radio network node the information needed to determine the robustness of transmission required for future transmissions.

According to some aspects, the configuring comprises selecting transmission properties corresponding to a robustness which is higher than the robustness of transmissions of the transmission of the first transport block, if the information indicative of a decoding margin is below a predefined level. In this case, if the decoding margin is below a certain level, the radio network node increases the robustness of future transmissions so as to not introduce unacceptable amount of errors in the transmissions.

According to some aspects, the configuring comprises selecting transmission properties corresponding to a robustness which is lower than the robustness of transmissions of the transmission of the first transport block, if the information indicative of a decoding margin is above a predefined level. In this case, if the decoding margin is above a certain level, the radio network node decreases the robustness of future transmissions so as to optimize the utilization of the transmission resources.

According to some aspects, the transmission properties comprise one or several of the following properties: Modulation and Coding Scheme, Radio Access Technology, Multiple Input Multiple Output transmission modes, Beam forming, Pre-coding Matrix and Transmission Power. When configuring any of the above properties, the transmission will use more or less transmission resources. The properties are all properties that the radio network node can reconfigure to adjust the transmission properties.

According to some aspects, the method comprises receiving a request to enable an ACK reporting format indicating a decoding margin from the wireless device. As previously discussed, by using an ACK to transmit the decoding margin, no extra transmission is required from the wireless device to send the decoding margin, because the ACK/NACK transmissions will either way be sent. In this example embodiment, it is the wireless device that requests enabling of ACK reporting.

According to some aspects, the method comprises sending a request to enable an ACK reporting format indicating a decoding margin to the wireless device. In this example embodiment, it is the radio network node that requests enabling of ACK reporting.

According to some aspects, the obtaining comprises receiving information defining one of several possible ACK levels, wherein each level corresponds to information indicative of a decoding margin. Hence, as also previously discussed, the configuration of ACKs is utilized to transmit the decoding margin.

According to some aspects, the method comprises sending information defining the configured transmission properties to the wireless device. I.e. the radio network node informs the wireless device of what transmission properties are to be used for future transmissions.

According to some aspects, the method comprises receiving, one or more further transport blocks from the wireless device using the configured transmission properties. Hence, the wireless device is using the configured transmission properties. A radio network node comprising a radio communication interface and processing circuitry is also disclosed to obtain the object. The processing circuitry is configured to send a first transport block to the wireless device using a first set of transmission properties between the radio network node and the wireless device, to request, from the wireless device, information indicative of a decoding margin associated with the first transport block, based on decoding of one or more punctured versions of the received first transport block in the wireless device, wherein an encoding redundancy of the punctured versions of the transport block is reduced compared to that of the first transport block, to obtain, from the wireless device, information indicative of a decoding margin, and to configure transmission properties to be used for further communication between the radio network node and the wireless device based on the decoding margin. The radio network node is further configured to perform all the aspects of the method in a network node described above and below.

According to some aspects, the radio network node is an eNodeB.

According to some aspects, the disclosure also relates to a computer program comprising computer program code which, when executed in a programmable controller of a radio network node, causes the radio network node to execute the methods described above and below

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIGS. 6a and 6b is a flowchart illustrating embodiments of method steps in a radio network node;

ABBREVIATIONS

Figure 1:
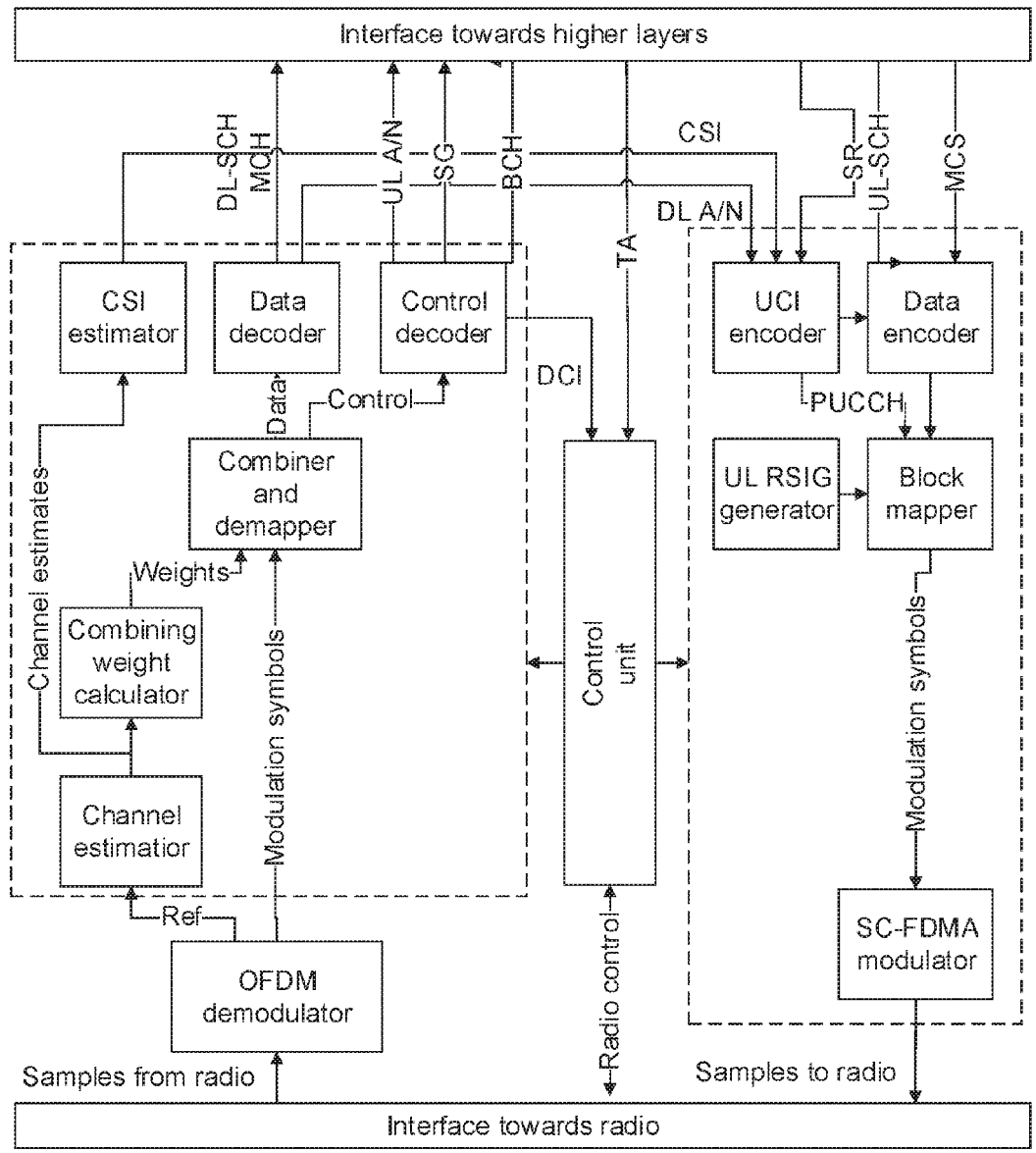
FIG. 1 is a sketch of LTE physical layer downlink and uplink processing.

ACK Acknowledged
ARQ Automatic repeat request
BLER Block error rate
CQI Channel quality indicator
CSI Channel state information
DCI Downlink control information information
DL Downlink
FFT Fast Fourier transform
HACK Hard ACK
HARQ Hybrid automatic repeat request
MCS Modulation and coding scheme
NACK Not Acknowledged
OFDM Orthogonal Frequency Division Modulation
PCFICH Physical control format indicator channel
PDCCH Physical downlink control channel
PDSCH Physical downlink shared channel
PUCCH Physical uplink control channel
PUSCH Physical uplink shared channel
QPSK Quadrature phase-shift keying
SACK Soft ACK
SG Scheduling grant
SR Scheduling request
TTI Transmission time interval
UCI Uplink control information
UE User equipment
UL Uplink

DETAILED DESCRIPTION

Aspects of the present disclosure will be described more fully hereinafter with reference to the accompanying drawings. The methods and devices disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

The inventors have realized that it may be useful, e.g. for the scheduler, to know, how close to its limit in terms of physical layer or link capacity, the receiver is operating. For example if a eNodeB is transmitting to a UE, the eNodeB would benefit from knowing to what extent the physical resources in the UE needed to decode the transport block are used. The eNodeB may, based on such knowledge, optimize the transmission properties, with less risk of introducing block errors occasionally. In a similar manner, an eNodeB that is receiving a transport block from a wireless device may use the information indicative of a decoding margin as input to future uplink scheduling from the UE.

A simplified sketch of the LTE physical layer in a UE is provided in FIG. 1. Samples are received from the radio, and subjected to an FFT in the OFDM demodulator. The output comprises resource elements carrying e.g. modulation symbols and reference signals. The reference signal are used by the Channel estimator for estimating the radio channel, and from the channel estimates and information on transmission mode and allocated bandwidth the optimum combining weights are derived by the Combining weight calculator. Some reference signals are also used by the CSI estimator for calculating channel state information (CSI, including CQI) which is fed back to the radio network node. Received modulation symbols and combining weights are fed to the Combiner and demapper which produce soft bits, which further are input to either of the decoders, depending on channel.

The UE first receives and decodes Physical Downlink Control Channel, PDCCH, to find downlink control information, DCI, providing information on allocations on Physical Downlink Shared Channel, PDSCH, as well as the transmission mode and modulation and coding scheme, MCS, in use, uplink allocations (scheduling grant; SG), uplink power control commands, etc. However before receiving it, the UE decodes the physical control format indicator channel, PCFICH, which tells how large the control region is, how many of the initial OFDM symbols in the subframe are carrying PDCCH. Also, before the decoding the radio propagation channel needs to be estimated and combining weights be produced.

PDCCH is convolutional encoded and is decoded by the Control decoder. The decoded DCI is fed to the Control unit which is used for configuring the baseband. The Control decoder further outputs feedback from the radio network node on whether transmissions on the uplink were successfully decoded or not (UL ACK/NACK; UL A/N), and is also used for decoding the master information block, MIB, carried on Physical Broadcast Channel, PBCH.

Once the DCI has been decoded, generally at a point in time about in the middle of the subframe, the PDSCH is next. Remaining reference signals in the subframe are used for improving the channel estimates, combining weights are tailored for the transmission mode in use, and then the received modulation symbols are combined and demapped, resulting in soft bits to be subjected to decoding. Since the whole subframe has to be received before the decoding can start, timing-wise this happens in the following subframe, in a pipelined fashion, while control information is received and decoded.

PDSCH is turbo encoded and it is decoded using the Data decoder which mainly comprises Hybrid Automatic Request, HARQ, functionality with associated soft bit combiner, and a turbo decoder. The turbo decoder iterates the decoding until the received data is successfully decoded (as indicated by a successful Cyclic Redundancy Check, CRC) or until running out of time (iterations). In case of failure to decode, it may give up earlier if metrics indicate that not much more information is corrected in subsequent iterations, so called early give-up function, EGF. Due to the pipelined fashion of processing the turbo decoder has to finish within the duration of one subframe. Feedback on whether data was successfully decoded or not (UL ACK/NACK; DL A/N) is provided to the radio network node in subframe n+4, where subframe n is the subframe where the data was received.

The CSI reporting may be either periodical, by which the UE knows beforehand when it is to be reported, but may also be periodical. Then the UE gets informed in the DCI that a CSI report is to be sent in subframe n+4.

The processing time for the OFDM demodulator, Channel Estimator, Combining weight calculator, Combiner and demapper, and Control decoder is highly dependent on the bandwidth in use, whereas the processing time for the Data decoder mainly depends on the UE category which is dictating the size of the HARQ buffers.

When the UE has received an SG in subframe n, it is to transmit on the Physical Uplink Shared Channel, PUSCH, in subframe n+4. Scheduling Requests, SR, DL A/N, and CSI constitute the Uplink Control Information, UCI, which is encoded by the UCI encoder. Data to be transmitted is encoded by the Data encoder which carriers out Turbo encoding, and then UCI is inserted. The modulation symbols are fed to the Block mapper, which maps the modulation symbols and uplink reference symbols, produced by UL RSIG generator, to the granted allocation. The resulting sequences of symbols are fed to the SC-FDMA modulator which essentially carries out an IFFT, and the output is sent to the radio.

In case no scheduling grant is received but the UE is to provide UL A/N, CSI and SR, the information is transmitted on the Physical Uplink Control Channel, PUCCH, according to a predefined format.

The processing time for UL RSIG generator, Block mapper, and SC-FDMA modulator is highly dependent on the bandwidth in use, whereas the processing time for Data encoder is depending on the UE category.

Furthermore, due to timing advance, TA, and the standard stipulating that cell radius up to 100 km shall be supported, the uplink subframe n may have to be transmitted 0.67 ms before downlink subfrarne n has been received. Hence the UE will have to be able to do all data- and CSI-related processing of a subframe within roughly 2 ms, to meet the times for DL A/N, acting on aperiodic CSI reporting requests, acting on UL A/N from network node, etc.

It shall be noted that due to cost and power effectiveness a UE is generally designed with just the processing capacity, memory size, etc. needed for the supported features and capabilities, e.g. number of DL and UL carriers, respectively, and supported bandwidth for each of them. This is reflected e.g. by that the FFTs and IFFTs are designed to meet the deadlines on OFDM symbol basis, but not much quicker.

One way of solving this is informing a base station about the constraints of the physical layer or link of the UE. The base station may then, instead of maintaining a target BLER, maintain a target decoding margin. Tuning the MCS based on information indicative of a decoding margin allows the base station to be more aggressive when searching for a proper MCS, as it can do so without introducing block errors. Since less conservative MCS will be used for the UE, more resources will be available to other UEs and the system throughput will improve. Such a solution requires determination of the constraints of the physical layer or link of the UE.

This disclosure proposes how to determine the constraints of the physical layer or link in the UE. The measure used to describe these "constraints" is in this disclosure referred to as the decoding margin. Information about the constraint is according to some aspects reported to the base station. The estimated decoding margin could also be used for other purposes, e.g. gathering statistics about channel or link quality variations.

The proposed technique discloses that the UE punctures received data from the base station and attempts to decode the punctured data. By doing this in the UE, the UE simulates that it has received data which is encoded less robustly, or in other words, with a higher code rate, and checks whether it is capable of decoding it. By performing this operation, the UE can for example inform the base station if it would have been able to decode received data with a higher code rate or in other words, it can inform the base station if it can handle other transmission properties than the ones used to transmit the initially received data. The base station can then adjust the transmission properties based on the received decoding margin.

The proposed technique of determining the decoding margin will now be described in further detail, using LTE as an example. In cellular systems such as LTE, a wireless device, in LTE called User Equipment, UE, gets configured by the base station which MCS and allocation size to use for transmissions on the uplink. For the downlink, the UE provides the eNodeB with information indicative of a decoding margin.

It should be noted that although terminology from 3GPP LTE is used herein to explain the example embodiments, this should not be seen as limiting the scope of the example embodiments to only the aforementioned system. Other wireless systems, including Wifi, WCDMA, WiMax, UMB and GSM, and future radio access systems may also benefit from the example embodiments disclosed herein.

Figure 2:
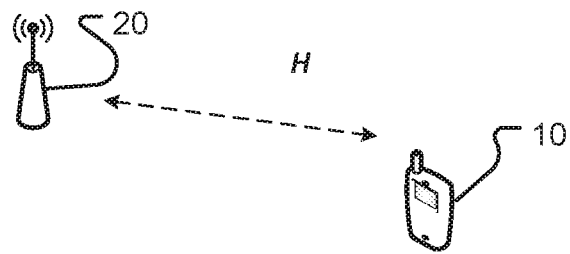
FIG. 2 is illustrating a radio network node and a wireless device.

FIG. 2 illustrates a communication system comprising a radio network node 20, in LTE an eNodeB, and a wireless device 10, in LTE a UE, where the proposed technique may be implemented. In this example the eNodeB 20 transmits a transport block to the UE 10, whereby the UE acknowledges successful reception and determines a margin of the successful decoding using the proposed technique. According to some aspects, the UE informs the eNodeB how close to the physical layer limits or link limits the transmission was.

Figure 3:
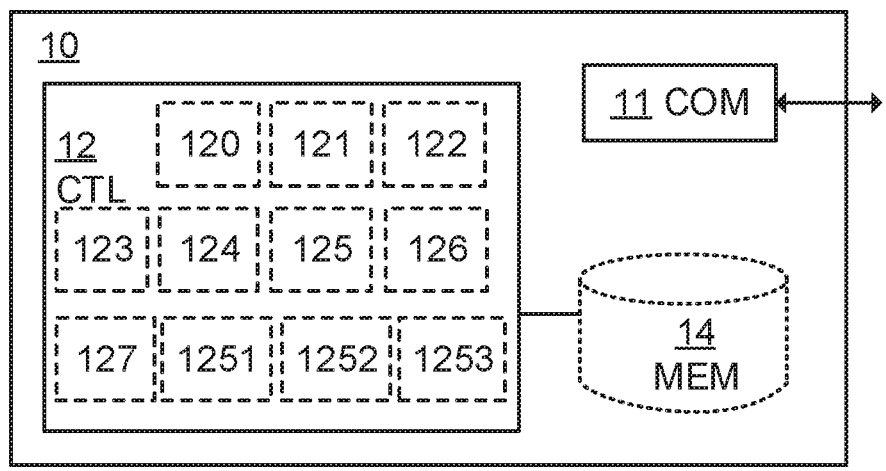
FIG. 3 is an example configuration of a wireless device, according to some of the example embodiments.
Figure 4:
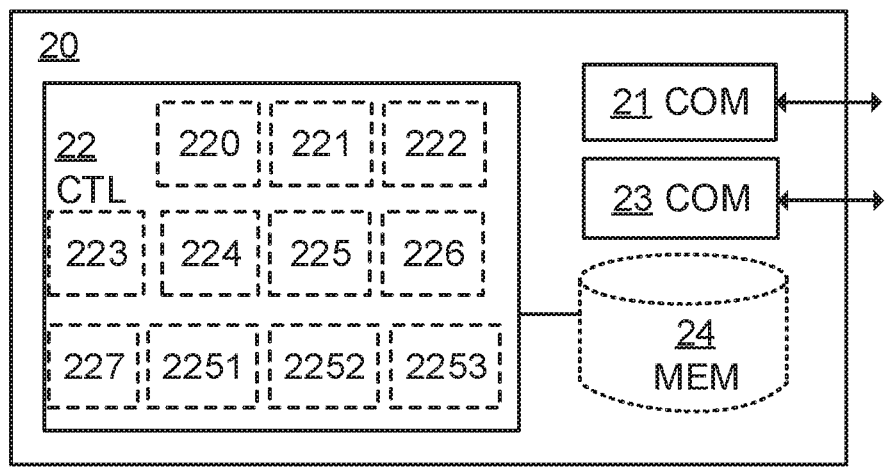
FIG. 4 is an example node configuration of a radio network node, according to some of the example embodiments.

FIGS. 3 and 4 illustrates examples of a wireless device 10 and a radio network node 20 which may incorporate some of the example node operation embodiments discussed below. The radio network node is e.g. an eNodeB. As shown in the figures, the wireless device 10 and the radio network node 20 may comprise a respective radio communication interface 11, 21, configured to receive and transmit any form of communications or control signals within a network. It should be appreciated that the radio communication interface 11, 21 may be comprised as any number of transceiving, receiving, and/or transmitting units or circuitry. It should further be appreciated that the radio communication interface 11, 21 may be in the form of any input/output communications port known in the art. The radio communication interface 11, 21 may comprise RF circuitry and baseband processing circuitry (not shown). Furthermore, the radio network node 20 may comprise a network communication interface 23 configured to exchange any form of communications or control signals with a core network and/or with other network nodes. The network communication is typically referred to as a backhaul.

The wireless device 10 and the radio network node 20 may further comprise at least one memory unit or circuitry 14, 24 respectively that may be in communication with the radio communication interface 11, 21. The memory 14, 24 may be configured to store received or transmitted data and/or executable program instructions. The memory 14, 24 may also be configured to store any form of beam-forming information, reference signals, and/or feedback data or information. The memory 14, 24 may be any suitable type of computer readable memory and may be of volatile and/or non-volatile type. According to some aspects, the disclosure relates to a computer program comprising computer program code or instruction sets which, when executed in a wireless device, causes the first wireless device to execute any aspect of the example node operations described below. According to some aspects, the disclosure relates to a computer program comprising computer program code or instruction sets which, when executed in a radio network node, causes the radio network node to execute any aspect of the example node operations described below.

The wireless device 10 and the radio network node 20 may further respectively comprise a controller or processing circuitry 12, 22. The processing circuitry 12, 22 may be any suitable type of computation unit, e.g. a microprocessor, digital signal processor, DSP, field programmable gate array, FPGA, or application specific integrated circuit, ASIC, or any other form of circuitry. It should be appreciated that the processing circuitry need not be provided as a single unit but may be provided as any number of units or circuitry. The processing circuitry is further adapted to perform all the aspects of the method in a network node described above and below.

Figure 5:
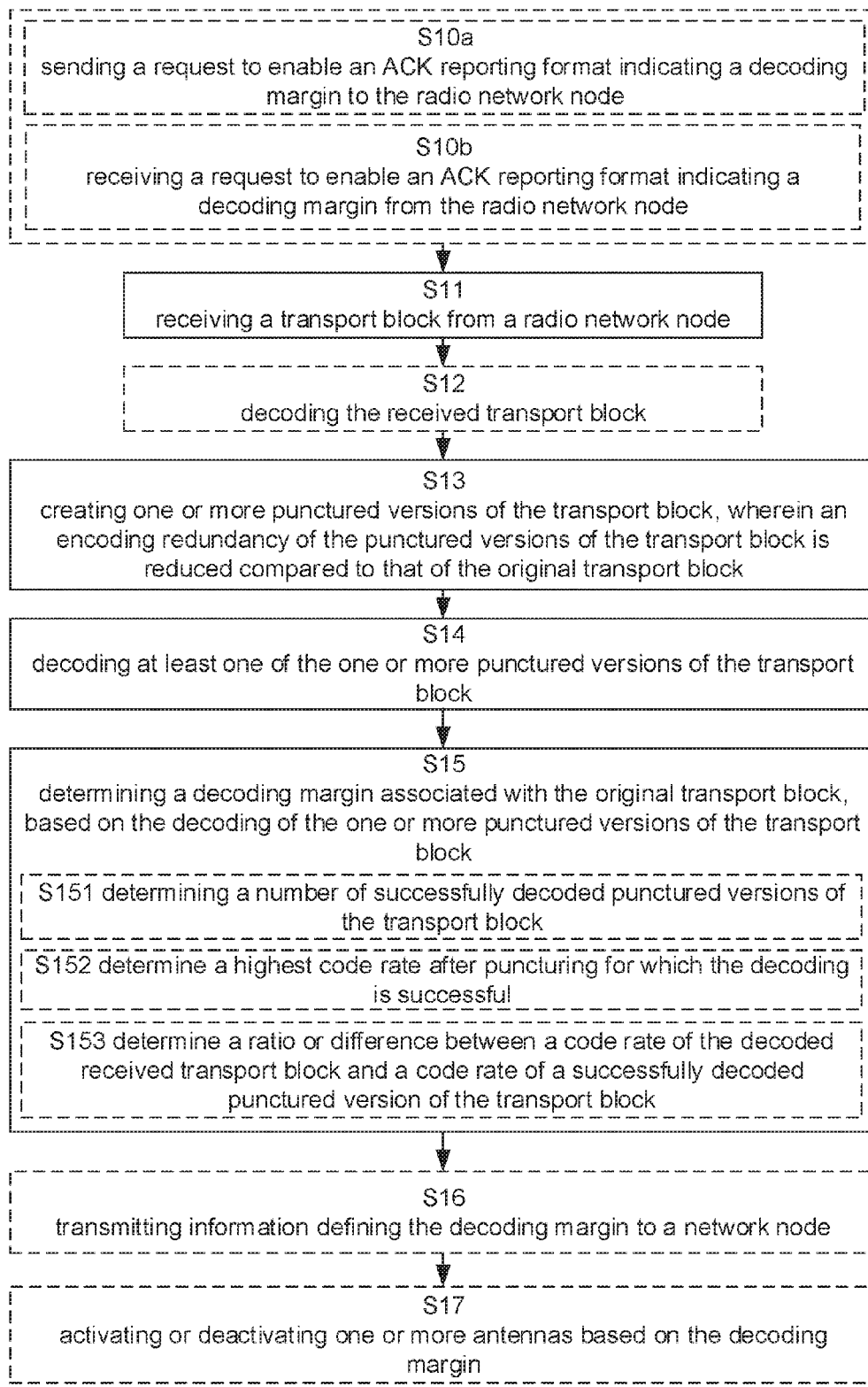
FIG. 5 is a flowchart illustrating embodiments of method steps in a wireless device.
Figure 6A:
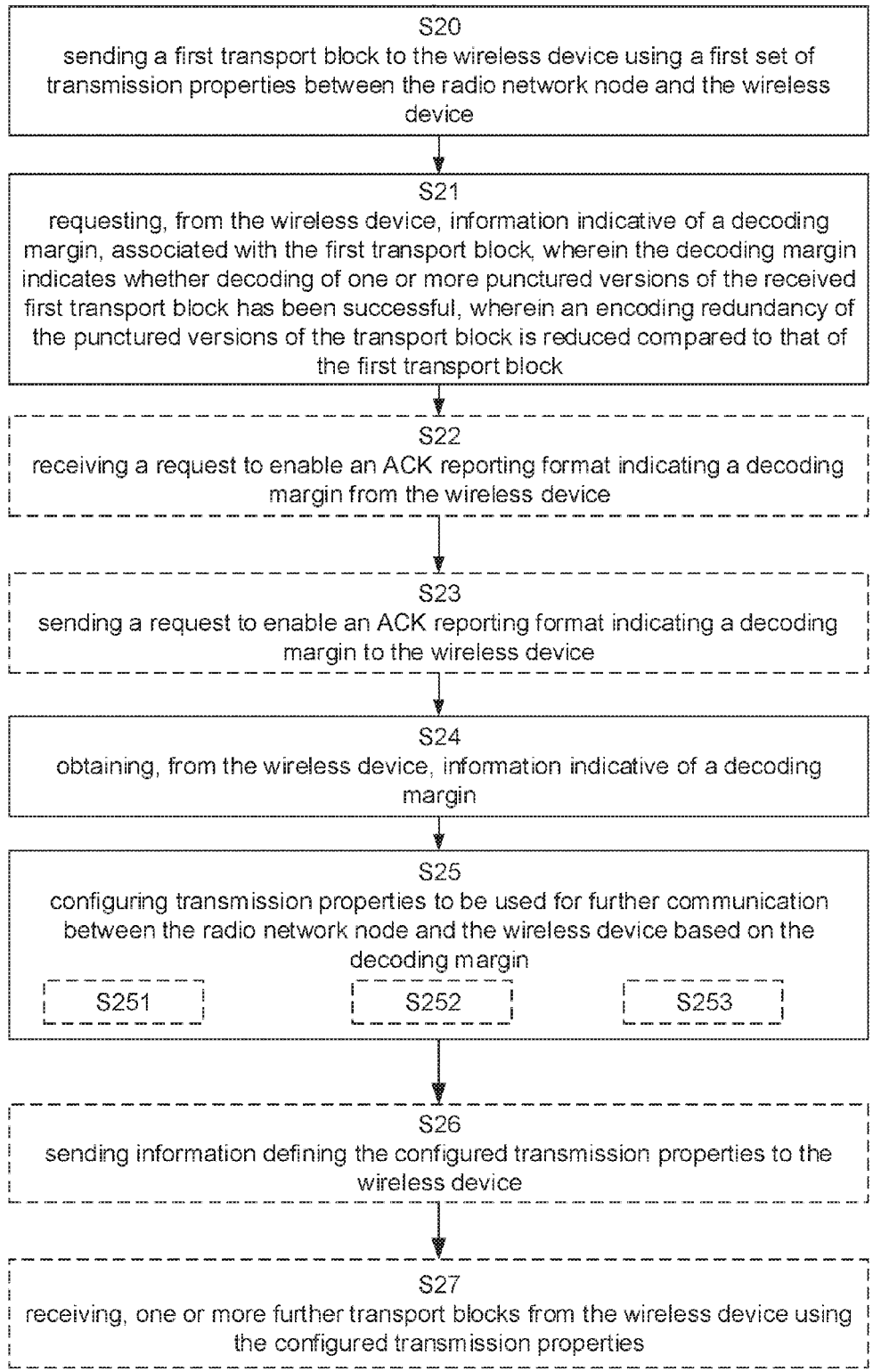

FIGS. 5, 6a and 6b illustrates the general concept of the proposed technique implemented in a wireless device 10 in FIG. 5 and in a radio network node 20 in FIGS. 6a and 6b.

It should be appreciated that FIGS. 5, 6a and 6b comprises some operations which are illustrated with a solid border and some operations which are illustrated with a dashed border. The operations which are comprised in a solid border are operations which are comprised in the broader example embodiment. The operations which are comprised in a dashed border are example embodiments which may be comprised in, or a part of or are further operations which may be taken in addition to the operations of the solid border example embodiments. It should be appreciated that the operations need not be performed in order. Furthermore, it should be appreciated that not all of the operations need to be performed. The example operations may be performed in any suitable order and in any combination.

The disclosure provides for a method, performed in a wireless device 10, for determining transmission properties for communication with a radio network node 20. The method comprises receiving S11 a transport block from a radio network node 20. The processing circuitry 12 of the wireless device is configured to receive S11 the transport block from the radio network node via the communication interface 11. According to some aspects, the processing circuitry comprises a receiver 121 for receiving the transport block. A transport block is a coded data stream, here received from the radio network node, conveyed during an individual scheduled transmission interval. For single layer transmission in LTE, there will be one transport block which will be generated for each Transmission Time Interval, TTI; that is, for every 1 ms Radio Subframe. The transport block size is determined by the number of Physical Resource Blocks, NPRB, and the MCS, see table 2 of the background. The MCS determines how much redundancy to have in allocated PRBs, and how many bits are sent; e.g. QPSK: 2 per modulation symbol, 16QAM (Quadrature Amplitude Modulation: 4 per modulation symbol, 64QAM: 6 per modulation symbol, etc.

According to some aspects, the method comprises decoding S12 the received transport block. The processing circuitry 12 of the wireless device is configured to decode the received transport block. According to some aspects, the processing circuitry comprises a decoder 122 for decoding transport block. By decoding the received transport block, it is for example determined whether the transmission properties of the initial transmission of the transport block was conservative enough; i.e. that the transport block was successfully received and decoded at the wireless device.

The method further comprises creating S13 one or more punctured versions of the transport block, wherein an encoding redundancy of the punctured versions of the transport block is reduced compared to that of the original transport block. The processing circuitry 12 of the wireless device is configured to create S13 the one or more punctured versions of the transport block, wherein an encoding redundancy of the punctured versions of the transport block is reduced compared to that of the original transport block. According to some aspects, the processing circuitry comprises a creator 123 for creating the punctured versions. Puncturing is here used as removing some of the parity bits or changing some of the parity bits to zeroes in an encoded code, in this case being the received transport block. This has the same effect as encoding with an error-correction code with a higher rate, or in other words, less redundancy. In other words, when puncturing is performed, redundancy of the coded transport block is reduced.

The method further comprises decoding S14 at least one of the one or more punctured versions of the transport block, and determining S15 a decoding margin associated with the original transport block, based on the decoding S14 of the one or more punctured versions of the transport block. The processing circuitry 12 of the wireless device is configured to decode S14 at least one of the one or more punctured versions of the transport block and to determine S15 a decoding margin associated with the original transport block, based on the decoding S14 of the one or more punctured versions of the transport block. According to some aspects, the processing circuitry comprises a decoder 124 for decoding and a determiner 125 for determining. When performing puncturing and decoding of punctured data, the same decoder of the wireless device as when decoding regular transmission can be used, i.e. the Data decoder of FIG. 1. The decoding margin, being determined based on the decoding of the punctured version of the transport block is an indication of how much margin the first received transport block was transmitted with. By performing the above, the wireless device can evaluate the transmission properties of the transmission of the transport block. The evaluation is made to see if the transport block could have been sent with less conservative transmission properties. In other words, it allows determining what decoding margin the transport block was transmitted with. The evaluation can be performed in the wireless device without involvement of the network node. A scheme for decoding margin estimation is thus provided using a metric that is not specific to the UE implementation, does not consume network resources and does not introduce additional latencies, while still avoiding block errors and re-transmissions. The puncturing pattern(s) to use may be, according to some aspects, conveyed via the signaling, via prior configuration, or be pre-defined in the standard.

Figure 7:
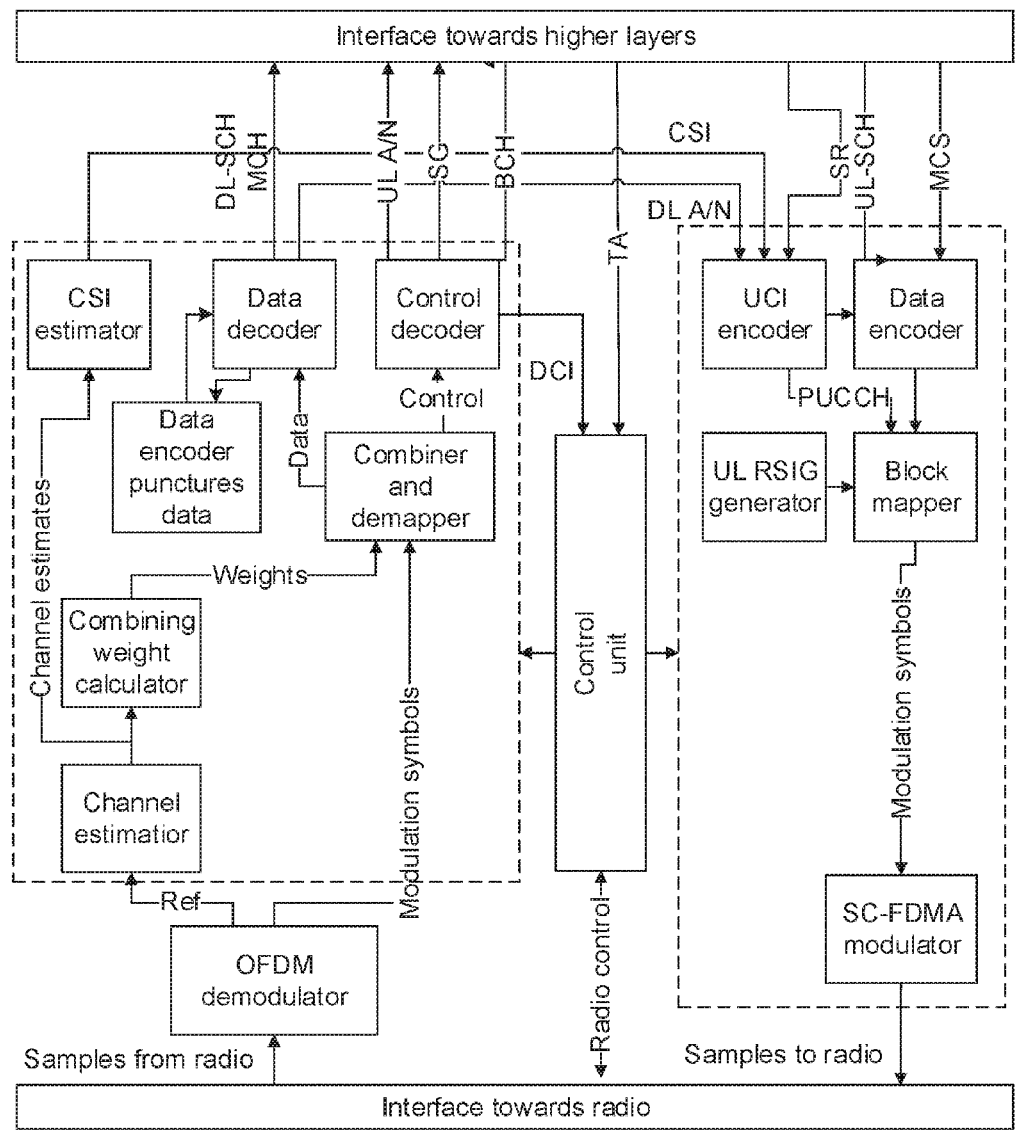
FIG. 7 is a sketch of LTE physical layer downlink and uplink processing according to some embodiments.

FIG. 7 is a sketch of LTE physical layer downlink and uplink processing according to some aspects of the disclosure. The only difference between FIG. 1 and FIG. 7 is the box connected to the data decoder reading "data encoder punctures data". The box is added to illustrate where the puncturing takes place in the wireless device according to some aspects of the disclosure. After puncturing, the data decoder attempts to decode the punctured data.

To, for example, save computational resources of the wireless device, the steps of creating S13 one or more punctured versions, the decoding S14 at least one of the one or more punctured versions of the transport block and the determining S15 a decoding margin are, according to some aspects, performed when the decoding S12 of the received transport block is successful. The puncturing is thus performed only after successfully decoding the received transport block, which saves computational resources of the wireless device. If the initial decoding of the transport block is unsuccessful, there is no decoding margin in the transmission of the transport block, or in other words, the decoding margin is negative. In the case when the initial decoding S12 is successful but a first decoding of a punctured version is unsuccessful, the decoding margin is zero. This is because the first transport block was decoded successfully but there was no decoding margin for any less redundancy of the encoded transport block.

To determine the decoding margin, the steps of creating S13 and decoding S14 are, according to some aspects, iterated until the decoding S14 of a punctured version of the transport block is unsuccessful. In this way, decoding of transport blocks with different encoding redundancies is performed. When a decoding is unsuccessful, the iteration is stopped because a level of encoding redundancy of a punctured version has been found at which the wireless device is unable to decode. Hence the decoding margin may be determined using the unsuccessful version.

In case there are several puncturing patterns to use, the procedure is for example repeated until all patterns have been investigated, or a NACK is experienced. According to some aspects the puncturing patterns are ordered with respect to the amount of puncturing, by which the wireless device may use logic to avoid having to investigate each and every one of the patterns; e.g. applying a bisection method approach. According to some aspects, the puncturing patterns are ordered according to binary search principles, for example halving intervals.

There are some alternative embodiments as to how to determine the decoding margin, or in other words, how to indicate the decoding margin. According to some aspects, the step of determining S15 a decoding margin comprises determining S151 a number of successfully decoded punctured versions of the transport block. The processing circuitry 12 is configured to determine S151 the number of successfully decoded versions. According to some aspects, the processing circuitry comprises a determiner 1251 for the determining. The number of successfully decoded versions is thus indicated in the decoding margin report. According to some aspects the puncturing patterns and the order of the puncturing patterns used are predetermined. In other words, puncturing sequences may he predefined in specification or signaled by the radio network node when the wireless device for example enters a high-reliability operating mode.

Hence, when the number of successfully decoded punctured versions of the transport block is indicated in the decoding margin, it is possible to determine which puncturing pattern was the last successful one and thus the code rate, or in other words, the redundancy, of the last successful punctured version is known. According to some aspects, the step of determining S15 a decoding margin comprises determining S152 a highest code rate after puncturing for which the decoding is successful, wherein the highest code rate is associated with a lowest coding redundancy. An alternative embodiment is that the step of determining S15 a decoding margin comprises determining S152 a highest rate of puncturing for which the decoding is successful, wherein the highest rate of puncturing is associated with the lowest coding redundancy. An alternative embodiment is that the step of determining S15 a decoding margin comprises determining S152 a puncturing pattern leading to the largest increase in code rate, or a corresponding highest code rate after puncturing, for which the decoding is successful, wherein the highest rate of puncturing is associated with the lowest coding redundancy. The processing circuitry 12 is configured to determine S152 the highest code rate. According to some aspects, the processing circuitry comprises a determiner 1252 for the determining. Code rate is here defined as k/n, where k is the number of bits comprising actual information and n is the total number of coded bits. In other words n-k bits are redundant. According to some aspects, the step of determining S15 a decoding margin comprises determining S153 a ratio or difference between a code rate of the decoded received transport block and a code rate of a successfully decoded punctured version of the transport block. The processing circuitry 12 is configured to determine S153 the ratio or difference. According to some aspects, the processing circuitry comprises a determiner 1253 for the determining. The above embodiments of determining the decoding margin are informative ways of determining the decoding margin which requires little computational resources. There may be the case where the wireless device tries all of the puncture patterns available to it. In such a case the decoding margin is, according to some aspects, indicated to be larger than the decoding margin of that associated with the puncture pattern with highest code rate.

The successfulness of the decoding is checked, according to some aspects, by using a Cyclic Redundancy Check. According to some aspects, whether decoding S12, S14 is successful or not is established with a Cyclic Redundancy Check of the decoded transport block. Cyclic Redundancy Checks are well known to a skilled person and is therefore not explained in detail here. A Cyclic Redundancy Check, CRC, is an effective way of determining the successfulness of decoding. According to some aspects, internal decoder metrics evaluate the successfulness of decoding by comparing the decoded sequence with the previously decoded sequence to determine any differences.

According to some aspects, each punctured version of the transport block comprises a transport block with a reduced encoding redundancy compared to that of a previous punctured transport block and compared to that of the received transport block. Hence, each new punctured version of the transport block has less encoding redundancy, i.e. higher code rate, than previous punctured versions. The reduction in encoding redundancy provides a way to determine at what encoding redundancy the decoding limit for the wireless device has been reached. Reducing the encoding redundancy successively when puncturing provides a structured way of determining when the limit is reached for the decoding.

The decoding margin is for example sent to the radio network node to inform it of the transmission capability. According to some aspects, method comprises transmitting S16 information defining the decoding margin to a radio network node. The processing circuitry 12 is configured to transmit S16 the information via the communication interface 11. According to some aspects, the processing circuitry comprises a transmitter 126 for transmitting. By informing the network node, the network node may utilize the information to for example reconfigure the transmission properties between the network node and the wireless device.

Puncturing and additional decoding attempts and decoding margin reporting do not need take place always. According to some aspects, transmission of the information indicating the decoding margin is signaled with a predetermined or signaled periodicity, on demand based on network node requests, or when possible, considering the wireless device's computational resources.

Depending on the decoding margin, the network node can be less conservative when selecting transmission properties for the wireless device, thereby allowing more resources to be used for other wireless devices. This may be done without risking occasionally losing transport blocks since the decoding margin is known. As a consequence, the system throughput can be improved while at the same time offering highly reliable communication with the device. The transmission is for example sent independently or together with an ACK transmission. According to some aspects, the transmitting S16 comprises to transmit an acknowledgment, ACK, of the successful reception and decoding of the transport block and wherein the ACK comprises an indication of the decoding margin. By using an ACK to transmit the decoding margin, no extra transmission is required from the wireless device to send the decoding margin, because the ACK/NACK transmissions will either way be sent. The ACK can be a Soft ACK, SACK. The existing HARQ implementation typically allows binary reporting (ACK or NACK), or possibly several NACK levels. To better allow tuning of transmission properties on the base station side without introducing more block errors one may introduce two or more levels of ACK, e.g., "Soft ACK", and "Hard ACK", where Soft ACK indicates that the block was decoded by the UE with low margin to exhaustion of physical layer or link processing resources, and Hard ACK indicates that the block was decoded with a good such margin. Another example of how to use Soft ACK is to use multiple SACK levels. In such a case the decoding margin is for example looked up in a table to find a corresponding SACK. SACK1, SACK2, etc. will then correspond to different decoding margins. The radio network node will have a corresponding table to determine the decoding margin from the SACK. According to some aspects, the ACK defines one of several possible ACK levels, wherein each ACK level corresponds to a predefined decoding margin. Hence, the configuration of ACK/NACK is utilized to transmit the decoding margin.

Using of ACK to report the decoding margin may either be initiated by the wireless device or the radio network node. So, according to some aspects, the method comprises sending S10a, from the wireless device 10, a request to enable an ACK reporting format indicating a decoding margin to the radio network node 20. In other words, the wireless device requests to the radio network node to use ACK when reporting the decoding margin. Or, according to some aspects, the method comprises receiving S10b, in the wireless device 10, a request to enable an ACK reporting format indicating a decoding margin from the radio network node 20.

In this case, it is the radio network node that requests that ACK is to be used for reporting the decoding margin. The processing circuitry 12 is configured send S10a, via the communication interface 11, the request or to receive S10b, via the communication interface 11, the request. According to some aspects, the processing circuitry comprises a sender 120a for the sending or a receiver 120b for the receiving.

It has been previously discussed that the transmission properties are configured in the radio network node based on the decoding margin. However, there are other uses for the decoding margin. One such example is to use the decoding margin to determine what transmission resources are enough to use in the wireless device. So, according to some aspects, the method comprises activating or deactivating S17 one or more antennas in the wireless device based on the decoding margin. The processing circuitry 12 is configured to deactivate S17 the one or more antennas. According to some aspects, the processing circuitry comprises a deactivator 127 for deactivating. In other words, the decoding margin can be used in the wireless device to determine how many antennas are needed for adequate reception, i.e. receiving the transmissions with acceptable reliability.

Figure 8:
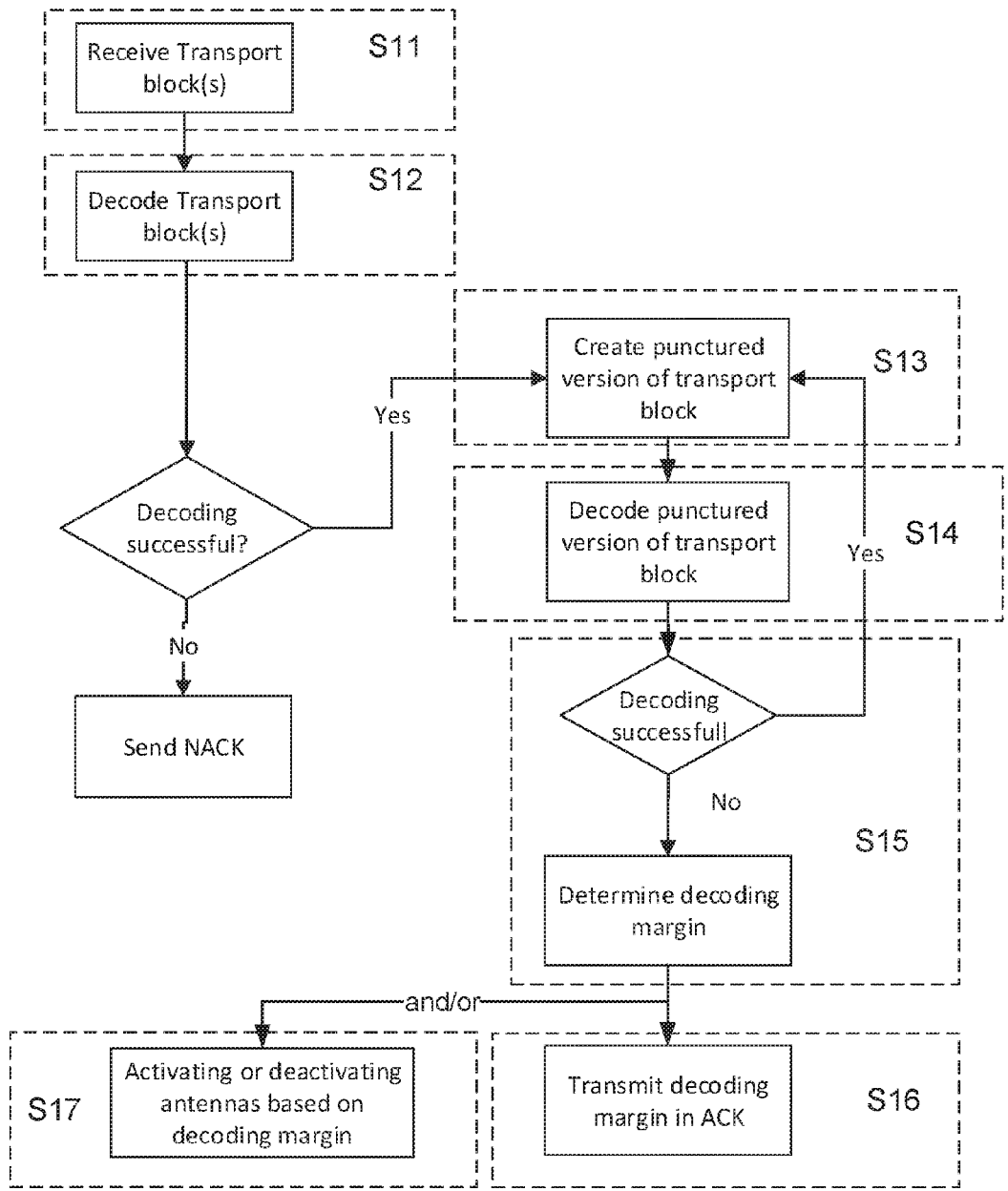
FIG. 8 is a flowchart showing exemplary processing steps in a wireless device in one example embodiment.

FIG. 8 is a flowchart showing exemplary processing steps in the wireless device in one example embodiment. The above described steps are illustrated with dotted lines and reference numbers to easily match it to the described method. In short, this exemplary embodiment comprises to receive a transport block, decode it, and if the decoding is successful create a punctured version of the transport block. If decoding is unsuccessful, a NACK is sent to the radio network node. The punctured version is decoded and if decoding is successful, another punctured version of the transport block is produced. The new punctured version preferably has less redundancy compared to the last one and compared to the initial transport block. If the decoding of the punctured version is unsuccessful, the decoding margin is determined and transmitted to the radio network node and/or antennas are activated or deactivated in the wireless device. The disclosure described in a LTE context using the flowchart in FIG. 8, shows the UE side aspects of the invention, applicable only for downlink.

According to some aspects, the disclosure also relates to a computer program comprising computer program code which, when executed in a programmable controller of a wireless device, causes the wireless device to execute the methods described above and below.

The disclosure provides for a method, performed in a radio network node 20 of configuring transmission properties for communication with a wireless device 10. The method comprises sending S20 a first transport block to the wireless device 10 using a first set of transmission properties between the radio network node 20 and the wireless device 10. The processing circuitry 22 of the radio network node is configured to receive send S20 the first transport block to the wireless device 10 via the communication interface 21. According to some aspects, the processing circuitry 22 comprises a sender 220 for sending, via the communication interface 21, the first transport block. The radio network node further requests S21, from the wireless device 10, information indicative of a decoding margin, associated with the first transport block, wherein the decoding margin indicates whether decoding of one or more punctured versions of the received first transport block in the wireless device 10 has been successful, wherein an encoding redundancy of the punctured versions of the transport block is reduced compared to that of the first transport block. The processing circuitry 22 of the radio network node is configured to request S21 the information indicative of a decoding margin via the communication interface 21. According to some aspects, the processing circuitry 22 comprises a requester 221 for requesting. According to some aspects the request is transmitted with the first transport block and may be part of the first transport block.

Alternatively to requesting S21, the radio network node may instruct the wireless device to: create one or more punctured versions of the first transport block, wherein an encoding redundancy of the punctured versions of the transport block is reduced compared to that of the original transport block, decode at least one of the one or more punctured versions of the transport block, determine a decoding margin associated with the first transport block, based on the decoding of the one or more punctured versions of the transport block and reporting the decoding margin to the radio network node. The decoding margin, the transport block and puncturing has been previous y described when discussing the method of the wireless device. As previously discussed, whether decoding is successful or not is, according to some aspects, established with a Cyclic Redundancy Check of the decoded transport block.

The requesting of information indicative of the decoding margin may be implicit, e.g. reporting is defined as regular MTC device behavior for a particular mode of operation, scenario, a particular set of reported capabilities, and/or transmission mode in use, or it may be explicit, e.g. depending on the Downlink Control Indicator, DCI, format in use or an information bit conveyed in the DCI (compare with aperiodic CSI reporting). The request may be for aperiodic or periodic reporting of the margin.

The method further comprises obtaining S24, from the wireless device 10, information indicative of a decoding margin. The processing circuitry 22 of the radio network node is configured to obtain S24 the information indicative of a decoding margin via the communication interface 21. According to some aspects, the processing circuitry 22 comprises an obtainer 224 for obtaining the information.

The method further comprises configuring S25 transmission properties to be used for further communication between the radio network node 20 and the wireless device 10 based on the decoding margin. The processing circuitry 22 is configured to configure S25 the transmission properties. According to some aspects, the processing circuitry 22 comprises a configurer 225 for configuring. The radio network node can thus avoid resource draining evaluations of the transmission properties by requesting a decoding margin from the wireless device which the wireless device uses the first transport block to determine. According to some aspects, the configuring S25 comprises changing S251 the robustness of transmissions of one or more further transport blocks between the radio network node 20 and the wireless device 10, in relation to the robustness of the transmission of the first transport block. The processing circuitry 22 is configured to change S251 the robustness. According to some aspects, the processing circuitry 22 comprises a changer 2251 for changing the robustness. Using the decoding margin, the radio network node can determine how to change the robustness of the transmission compared to that of the one used when transmitting the first transport block. I.e. the decoding margin gives the radio network node the information needed to determine the robustness of transmission required for future transmissions.

The decoding margin is for example used in the management of the CQI outer loop in the scheduler used for CQI offset selection of the radio network node. The received decoding margin reports are used to adjust the offset value. According to some aspects, the all offset may be adaptively adjusted in a closed-loop configuration so that the average decoding margin over a longer period of time becomes equal to a predetermined value. In an alternative embodiment, the smallest decoding margin during an observation period may be driven to a predetermined value. The offset adjustment process may be implemented as a controller in a control loop, using controller structures known in prior art.

There are several parameters that can be changed to change the robustness of the transmission; such as Code rate, DL TX power, MIMO/SISO, modulation, etc. The robustness of a transmission is meant to encompass all properties of the transmission that affect the throughput of data transmission when the conditions change. In other words, a robust transmission has better throughput of data for the individual wireless device in varying channel conditions than a less robust transmission. Less robust transmissions are in general less resource demanding hut a higher robustness will give a better throughput of data or reduce the probability of sudden throughput drops when the conditions change. Another term for robustness may be reliability. High reliability of a transmission corresponds to high robustness of a transmission.

The decoding margin will determine how to configure the transmission properties. According to some aspects, the configuring S25 comprises selecting S252 transmission properties corresponding to a robustness which is higher than the robustness of transmissions of the transmission of the first transport block, if the information indicative of a decoding margin is below a predefined level. The processing circuitry 22 is configured to select S252 the transmission properties. According to some aspects, the processing circuitry 22 comprises a selector 2252 for selecting. In this case, if the decoding margin is below a certain level, the radio network node increases the robustness of future transmissions so as to not introduce unacceptable amount of errors or error probability in the transmissions. On the other hand, according to some aspects, the configuring S25 comprises selecting S253 transmission properties corresponding to a robustness which is lower than the robustness of transmissions of the transmission of the first transport block, if the information indicative of a decoding margin is above a predefined level. The processing circuitry 22 is configured to select S253 the transmission properties. According to some aspects, the processing circuitry 22 comprises a selector 2253 for selecting. In this case, if the decoding margin is above a certain level, the radio network node decreases the robustness of future transmissions so as to optimize the utilization of the transmission resources. By this method, the radio network node can be less conservative when selecting transmission properties for the device, thereby allowing more resources to be used for other UEs. As a consequence the system throughput can be improved while at the same time offering highly reliable communication with the device.

According to some aspects, the transmission properties comprise one or several of the following properties: Modulation and Coding Scheme, Radio Access Technology, Multiple Input Multiple Output transmission modes, Beam forming, Pre-coding Matrix and Transmission Power. When configuring any of the above properties, the transmission will use more or less transmission resources and be more or less robust. The properties are all properties that the radio network node can reconfigure to adjust the transmission properties and thus also the robustness.

According to some aspects, the radio network node 20 sends S21 a request to enable reporting of information indicative of a decoding margin, to the wireless device 10 or receives S22 a request to enable reporting of information indicative of a decoding margin, from the wireless device 10.

As previously described when discussing the method of the wireless device, either the wireless device 10 or the radio network node 20 may request to enable ACK reporting. According to some aspects, the method comprises receiving S22 a request to enable an ACK reporting format indicating a decoding margin from the wireless device 10. The processing circuitry 22 is configured to receive S22 the request via the communication circuitry 21. According to some aspects, the processing circuitry 22 comprises a receiver 222 for receiving the request. As previously discussed, by using an ACK to transmit the decoding margin, no extra transmission is required from the wireless device to send the decoding margin, because the ACK/NACK transmissions will either way be sent. According to some aspects, a SACK with multiple levels or a margin value causes more bits to be transmitted than a simple ACK/NACK. In this example embodiment, it is the wireless device that requests enabling of ACK reporting. According to some aspects, the method comprises sending S23 a request to enable an ACK reporting format indicating a decoding margin to the wireless device 10. The processing circuitry 22 is configured to send S23 the request via the communication circuitry 21. According to some aspects, the processing circuitry 22 comprises a sender 22 for sending the request. In this example embodiment, it is the radio network node that requests enabling of ACK reporting.

According to some aspects, the obtaining S24 comprises receiving information defining one of several possible ACK levels, wherein each level corresponds to information indicative of a decoding margin. ACK has been previously discussed when discussing the method of the wireless device. Hence, as also previously discussed, the configuration of ACKs is utilized to transmit the decoding margin.

According to some aspects, the method comprises sending S26 information defining the configured transmission properties to the wireless device 10. The processing circuitry 22 is configured to send S26 the information via the communication circuitry 21. According to some aspects, the processing circuitry 22 comprises a sender 226 for sending the information. I.e. the radio network node informs the wireless device of what transmission properties are to be used for future transmissions. This enables the wireless device to make corresponding adjustments in transmission properties.

When the transmission properties are configured, according to some aspects, the method comprises receiving S27, one or more further transport blocks from the wireless device 10 using the configured transmission properties. The processing circuitry 22 is configured to receive S27 one or more further transport blocks, via the communication circuitry 21. According to some aspects, the processing circuitry 22 comprises a receiver 227 for receiving the one or more further transport blocks. Hence, the wireless device is using the configured transmission properties.

According to some aspects, the disclosure also relates to a computer program comprising computer program code which, when executed in a programmable controller of a radio network node, causes the radio network node to execute the methods described above and below.

According to some aspects, the radio network node is an eNodeB in an LTE network. The disclosure is described in the context of LTE but is equally applicable to other RATs supporting CSI reporting, link adaptation and HARQ operation.

The description of the example embodiments provided herein have been presented for purposes of illustration. The description is not intended to he exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A "wireless device" as the term may be used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. Furthermore, a device may be interpreted as any number of antennas or antenna elements.

Although the description is mainly given for a user equipment, as measuring or recording unit, it should be understood by the skilled in the art that "user equipment" is a non-limiting term which means any wireless device, terminal, or node capable of receiving in DL and transmitting in UL (e.g. PDA, laptop, mobile, sensor, fixed relay, mobile relay or even a radio base station, e.g. femto base station).

A cell is associated with a radio node, where a radio node or radio network node or eNodeB used interchangeably in the example embodiment description, comprises in a general sense any node transmitting radio signals used for measurements, e. eNodeB, macro/micro/pico/femto base station, home eNodeB, relay, beacon device, or repeater. A radio node herein may comprise a radio node operating in one or more frequencies or frequency bands. It may be a radio node capable of CA. It may also be a single- or multi-RAT node. A multi-RAT node may comprise a node with co-located RATs or supporting multi-standard radio (MSR) or a mixed radio node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a wireless device, for determining transmission properties for communication with a radio network node, wherein the method comprises:
   receiving a transport block from a radio network node;
   creating one or more punctured versions of the transport block, wherein an encoding redundancy of the punctured versions of the transport block is reduced compared to that of the original transport block;
   decoding at least one of the one or more punctured versions of the transport block; and
   determining a decoding margin associated with the original transport block, based on the decoding of the one or more punctured versions of the transport block.

2. The method according to claim 1, comprising decoding the received transport block.

3. The method according to claim 2, wherein the steps of creating one or more punctured versions, the decoding at least one of the one or more punctured versions of the transport block and the determining a decoding margin are performed when the decoding of the received transport block is successful.

4. The method according to claim 3, wherein whether decoding is successful or not is established with a Cyclic Redundancy Check of the decoded transport block.

5. The method of claim 1, wherein the steps of creating and decoding are iterated until the decoding of a punctured version of the transport block is unsuccessful.

6. The method of claim 1, wherein the step of determining a decoding margin comprises determining a number of successfully decoded punctured versions of the transport block.

7. The method of claim 1, wherein the step of determining a decoding margin comprises determining a highest code rate after puncturing for which the decoding is successful, wherein the highest code rate is associated with a lowest coding redundancy.

8. The method of claim 1, wherein the step of determining a decoding margin comprises determining a ratio or difference between a code rate of the decoded received transport block and a code rate of a successfully decoded punctured version of the transport block.

9. The method according to claim 1, wherein each punctured version of the transport block comprises a transport block with a reduced encoding redundancy compared to that of a previous punctured transport block and compared to that of the received transport block.

10. The method according to claim 1, wherein the method comprises:
    transmitting information defining the decoding margin to a radio network node.

11. The method of claim 10, wherein the transmitting comprises to transmit an acknowledgement (ACK) of the successful reception and decoding of the transport block and wherein the ACK comprises an indication of the decoding margin.

12. The method of claim 11, wherein the ACK defines one of several possible ACK levels, wherein each ACK level corresponds to a predefined decoding margin.

13. The method of claim 11, comprising:
    sending a request to enable an ACK reporting format indicating a decoding margin to the radio network node.

14. The method of claim 11, comprising:
    receiving a request to enable an ACK reporting format indicating a decoding margin from the radio network node.

15. The method according to claim 1, wherein the method comprises:
    activating or deactivating one or more antennas based on the decoding margin.

16. A nontransitory computer-readable storage medium comprising computer program code which, when executed in a programmable controller of a wireless device, causes the wireless device to execute a method for determining transmission properties for communication with a radio network node, wherein the method comprises:
  receiving a transport block from a radio network node;
  creating one or more punctured versions of the transport block, wherein an encoding redundancy of the punctured versions of the transport block is reduced compared to that of the original transport block;
  decoding at least one of the one or more punctured versions of the transport block; and
  determining a decoding margin associated with the original transport block, based on the decoding of the one or more punctured versions of the transport block.

17. A wireless device comprising a radio communication interface and processing circuitry, wherein the processing circuitry is configured:
  to receive a transport block from a radio network node;
  to create one or more punctured versions of the transport block, wherein an encoding redundancy of the punctured versions of the transport block is reduced compared to that of the original transport block;
  to decode at least one of the one or more punctured versions of the transport block; and
  to determine a decoding margin associated with the original transport block, based on the decoding of the one or more punctured versions of the transport block.

18. The wireless device of claim 17, wherein the processing circuitry is configured to decode the received transport block.

19. The wireless device of claim 18, wherein to create one or more punctured versions, to decode at least one of the one or more punctured versions of the transport block and to determine a decoding margin are performed by the processing circuitry when the decoding of the received transport block is successful.

20. The wireless device of claim 17, wherein the processing circuitry is configured to iterate the creating and the decoding until the decoding of a punctured version of the transport block is unsuccessful.

21. The wireless device of claim 17, wherein each punctured version of the transport block comprises a transport block with a reduced encoding redundancy compared to that of a previous punctured transport block and compared to that of the received transport block.

22. The wireless device of claim 17, wherein the processing circuitry is configured to transmit information defining the decoding margin to a radio network node.

23. A method, performed in a radio network node of configuring transmission properties for communication with a wireless device, the method comprising:
  sending a first transport block to the wireless device using a first set of transmission properties between the radio network node and the wireless device;
  requesting, from the wireless device, information indicative of a decoding margin, associated with the first transport block, wherein the decoding margin indicates whether decoding of one or more punctured versions of the received first transport block in the wireless device has been successful, wherein an encoding redundancy of the punctured versions of the transport block is reduced compared to that of the first transport block;
  obtaining, from the wireless device, information indicative of a decoding margin, and
  configuring transmission properties to be used for further communication between the radio network node and the wireless device based on the decoding margin.

24. The method of claim 23, wherein the configuring comprises changing the robustness of transmissions of one or more further transport blocks between the radio network node and the wireless device, in relation to the robustness of the transmission of the first transport block.

25. The method of claim 23, wherein the configuring comprises selecting transmission properties corresponding to a robustness which is higher than the robustness of transmissions of the transmission of the first transport block, if the information indicative of a decoding margin is below a predefined level.

26. The method of claim 23, wherein the configuring comprises selecting transmission properties corresponding to a robustness which is lower than the robustness of transmissions of the transmission of the first transport block, if the information indicative of a decoding margin is above a predefined level.

27. The method of claim 23, wherein the transmission properties comprises one or several of the following properties: Modulation and Coding Scheme, Radio Access Technology, Multiple Input Multiple Output transmission modes, Beam forming, Pre-coding Matrix and Transmission Power.

28. The method of claim 23, comprising:
  receiving a request to enable an ACK reporting format indicating a decoding margin from the wireless device.

29. The method of claim 28, wherein the obtaining comprises receiving information defining one of several possible ACK levels, wherein each level corresponds to information indicative of a decoding margin.

30. The method of claim 23, comprising:
  sending a request to enable an ACK reporting format indicating a decoding margin to the wireless device.

31. The method of claim 23, comprising:
  sending information defining the configured transmission properties to the wireless device.

32. The method of claim 31, comprising:
  receiving, one or more further transport blocks from the wireless device using the configured transmission properties.

33. A nontransitory computer-readable storage medium comprising computer program code which, when executed in a programmable controller of a radio network node, causes the radio network node to execute a method of configuring transmission properties for communication with a wireless device, the method comprising:
  sending a first transport block to the wireless device using a first set of transmission properties between the radio network node and the wireless device;
  requesting, from the wireless device, information indicative of a decoding margin, associated with the first transport block, wherein the decoding margin indicates whether decoding of one or more punctured versions of the received first transport block in the wireless device has been successful, wherein an encoding redundancy of the punctured versions of the transport block is reduced compared to that of the first transport block;
  obtaining, from the wireless device, information indicative of a decoding margin, and
  configuring transmission properties to be used for further communication between the radio network node and the wireless device based on the decoding margin.

34. A radio network node comprising a radio communication interface and processing circuitry, wherein the processing circuitry is configured:
  to send a first transport block to the wireless device using a first set of transmission properties between the radio network node and the wireless device;

to request, from the wireless device, information indicative of a decoding margin associated with the first transport block, based on decoding of one or more punctured versions of the received first transport block in the wireless device, wherein an encoding redundancy of the punctured versions of the transport block is reduced compared to that of the first transport block;

to obtain from the wireless device, information indicative of a decoding margin; and to configure transmission properties to be used for further communication between the radio network node and the wireless device based on the decoding margin.

35. The radio network node of claim 34, wherein to configure comprises to change the robustness of transmissions of one or more further transport blocks between the radio network node and the wireless device, in relation to the robustness of the transmission of the first transport block.

36. The radio network node of claim 34, wherein the radio network node is an eNodeB.

37. The radio network node of claim 34, wherein the transmission properties comprises one or several of the following properties: Modulation and Coding Scheme, Radio Access Technology, Multiple Input Multiple Output transmission modes, Beam forming, Pre-coding Matrix and Transmission Power.

* * * * *

UNITED STATES PATENT AND TRADEMARK OFFICE
CERTIFICATE OF CORRECTION

| | | |
|---|---|---|
| PATENT NO. | : 9,780,913 B2 | Page 1 of 2 |
| APPLICATION NO. | : 14/905283 | |
| DATED | : October 3, 2017 | |
| INVENTOR(S) | : Reial et al. | |

It is certified that error appears in the above-identified patent and that said Letters Patent is hereby corrected as shown below:

In the Drawings

In Fig. 1, Sheet 1 of 7, delete "DL-SCH MCH" and insert -- DL-SCH MCS --, therefor.

In Fig. 6a, Sheet 4 of 7, in Step "S21", in Line 4, delete "block has" and insert -- block in the wireless device has --, therefor.

In Fig. 7, Sheet 6 of 7, delete "DL-SCH MCH" and insert -- DL-SCH MCS --, therefor.

In the Specification

In Column 1, Line 22, delete "Terrestrial Access" and insert -- Terrestrial Radio Access --, therefor.

In Column 1, Line 43, delete "COI" and insert -- CQI --, therefor.

In Column 2, Line 16, delete "Physical Data" and insert -- Physical Downlink --, therefor.

In Column 7, Line 49, delete "embodiments." and insert -- embodiments; --, therefor.

In Column 7, Lines 51-52, delete "embodiments." and insert -- embodiments; --, therefor.

In Column 7, Line 55, delete "FIGS. 6a and 6b is a flowchart" and insert -- FIGS. 6a and 6b are flowcharts --, therefor.

In Column 7, Line 65, delete "ARO" and insert -- ARQ --, therefor.

In Column 8, Line 2, delete "information information" and insert -- information --, therefor.

In Column 9, Line 8, delete "is, how" and insert -- is, i.e., how --, therefor.

Signed and Sealed this
Fifth Day of June, 2018

Andrei Iancu
*Director of the United States Patent and Trademark Office*

CERTIFICATE OF CORRECTION (continued)
U.S. Pat. No. 9,780,913 B2

In Column 9, Line 35, delete "Request," and insert -- Repeat Request, --, therefor.

In Column 10, Line 16, delete "subfrarne" and insert -- subframe --, therefor.

In Column 12, Line 16, delete "of or" and insert -- of, or --, therefor.

In Column 12, Line 43, delete "Modulation:" and insert -- Modulation): --, therefor.

In Column 14, Line 34, delete "may he" and insert -- may be --, therefor.

In Column 16, Line 17, delete "SACK. SACK1 ," and insert -- SACK, SACK1, --, therefor.

In Column 16, Line 33, delete "Slob," and insert -- Sl0b, --, therefor.

In Column 17, Line 54, delete "previous y" and insert -- previously --, therefor.

In Column 17, Line 64, delete "Indicator," and insert -- Information, --, therefor.

In Column 18, Line 37, delete "all offset" and insert -- CQI offset --, therefor.

In Column 18, Line 54, delete "hut" and insert -- but --, therefor.

In Column 19, Lines 62-63, delete "sender 22" and insert -- sender 223 --, therefor.

In Column 20, Line 39, delete "to he" and insert -- to be --, therefor.

In Column 21, Line 26, delete "e. eNodeB," and insert -- e.g., eNodeB, --, therefor.

In the Claims

In Column 23, Line 64, in Claim 23, delete "margin, and" and insert -- margin; and --, therefor.

In Column 24, Line 12, in Claim 26, delete "23 ," and insert -- 23, --, therefor.

In Column 24, Line 58, in Claim 33, delete "margin, and" and insert -- margin; and --, therefor.

In Column 25, Line 8, in Claim 34, delete "obtain" and insert -- obtain, --, therefor.